United States Patent [19]
Riedel

[11] 4,388,748
[45] Jun. 21, 1983

[54] BAND CLAMPING DEVICE

[75] Inventor: Elmer E. Riedel, Cleveland, Ohio

[73] Assignee: The Triad Metal Products Company, Cleveland, Ohio

[21] Appl. No.: 273,902

[22] Filed: Jun. 15, 1981

[51] Int. Cl.$^3$ .................. B65D 63/00; F16L 33/14
[52] U.S. Cl. ................................ 24/269; 24/68 BT
[58] Field of Search ............ 24/269, 19, 68 BT, 16 R

[56] References Cited

U.S. PATENT DOCUMENTS

| 1,403,042 | 1/1922 | Leonard | 24/269 |
| 1,735,346 | 11/1929 | Alford | 24/269 |
| 1,963,436 | 6/1934 | Dumke | 24/269 |
| 2,354,833 | 8/1944 | Roberts | 24/269 |
| 2,604,098 | 7/1952 | Kranc | 24/269 |

FOREIGN PATENT DOCUMENTS

| 885797 | 8/1953 | Fed. Rep. of Germany | 24/269 |
| 646020 | 11/1968 | France | 24/269 |
| 82388 | 1/1935 | Sweden | 24/269 |
| 24622 | 11/1907 | United Kingdom | 24/269 |

Primary Examiner—John J. Wilson
Attorney, Agent, or Firm—Baldwin, Egan, Walling & Fetzer

[57] ABSTRACT

A band clamping device including a frame having an elongated planar base and a pair of spaced parallel side walls extending upwardly from the sides of the base. A rotary winding shaft extends transversely across the frame and is rotatably mounted in the side walls. The shaft has ratchet teeth disposed circumferentially around its circumference adjacent one end of the shaft interiorly of the spaced walls to form a ratchet wheel on the shaft. The elongated base has an extension at one end bent over upwardly partially upon itself with a part of the free end of the bent over portion forming a resilient pawl operatively and resiliently engaging the teeth of the ratchet wheel for releasably holding the shaft from rotating. A flexible clamping band is provided for encircling an associated object to be clamped and is secured at one end to the base. The shaft has a band insertion slot formed longitudinally in the shaft between the side walls for receiving the free end portion of the band therein, whereby a preselected length of the free end portion of the band may be inserted in the slot after which the shaft may be rotated to bend and lock the free end portion of the band in the device. The shaft is rotatable clockwise or counterclockwise to selectively lock or unlock the free end portion of the band.

2 Claims, 11 Drawing Figures

U.S. Patent   Jun. 21, 1983   Sheet 1 of 2   4,388,748
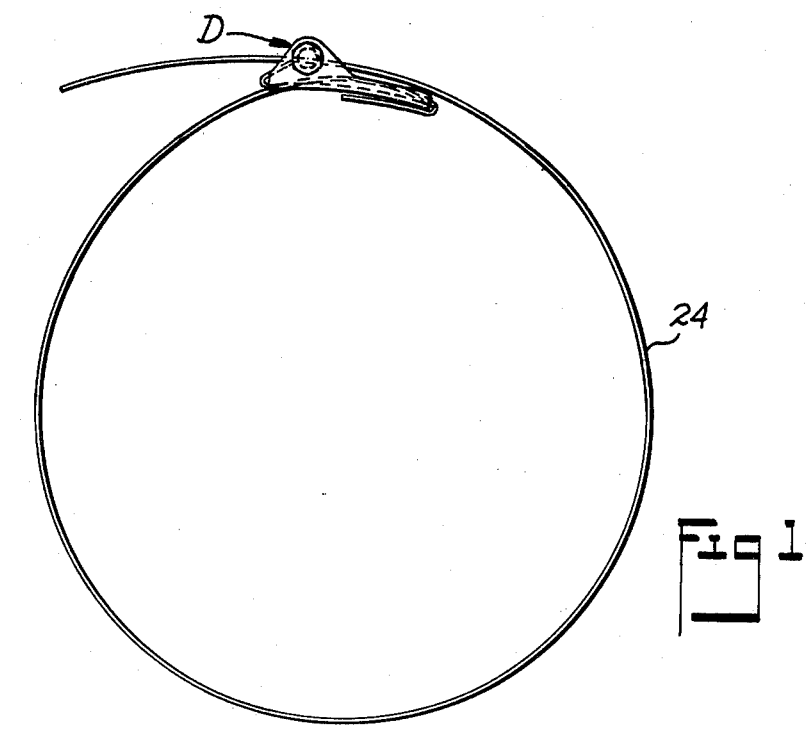
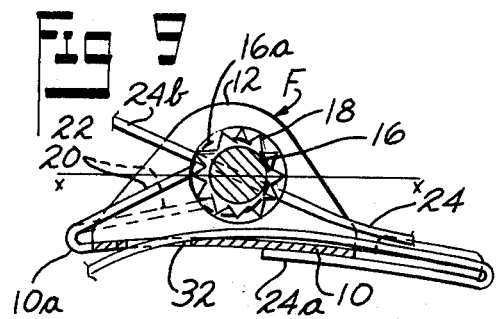
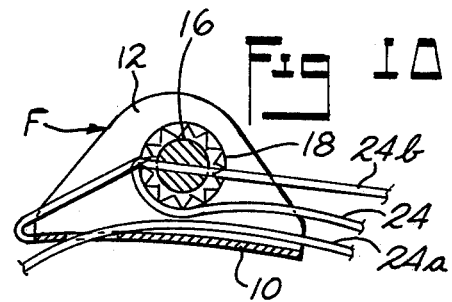
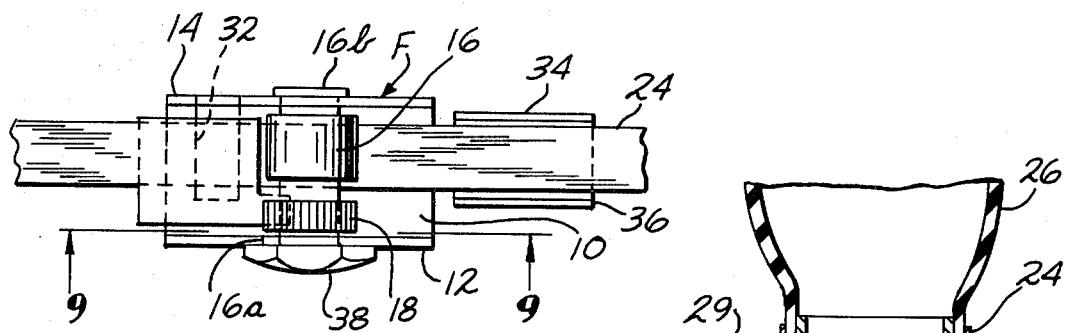
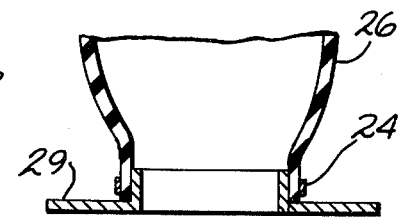

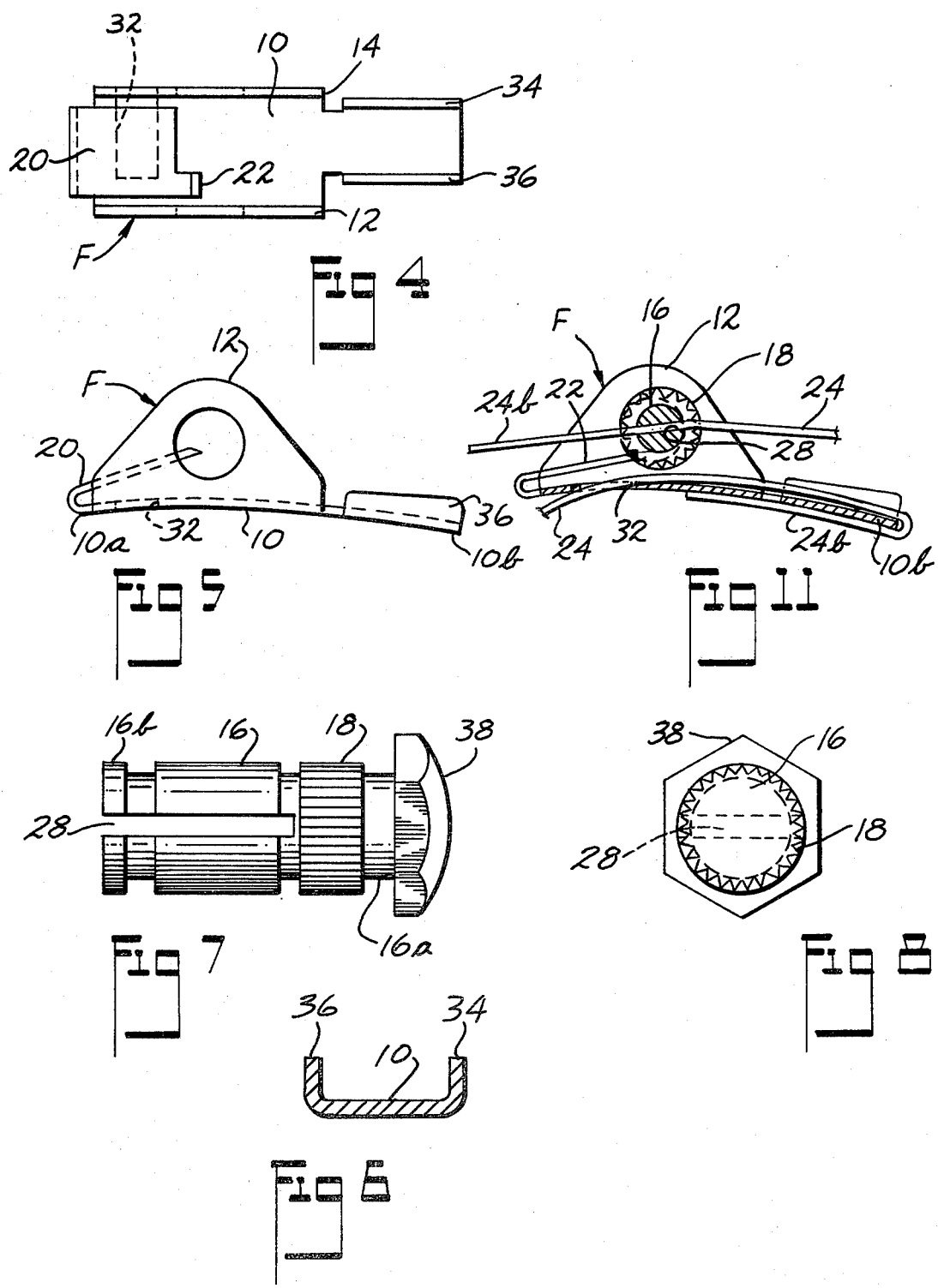

BAND CLAMPING DEVICE

This invention relates to band clamping devices and more particularly to a band clamping device of the type wherein a preselected length of the free end portion of the band is inserted in a slot in a transversely disposed rotatable shaft on the device, such shaft being rotatable in either direction to selectively lock or unlock the free end of the band from the shaft.

BACKGROUND OF THE INVENTION

The band clamping device according to the present invention finds its use, for example, in attaching power cable, tubing for electric wire, and so forth along the lengthwise direction of a pole or mast so as to fix such wire materials to the pole, or in fixing a bracket for mounting thereon various devices and appliances for telecommunications and power supply, or advertising material, street lighting, and so forth on the pole.

The present invention is also useful in fixing the bracket for the abovementioned appliances and equipments for the telecommunication and power supply, or attaching various sign boards onto the pole or mast, either standing upright or being laid down, at various places such as, for example, railway stations, etc. Or, in the case of temporary mounting of electric power supply appliances, sign board, etc. onto scaffolding pillar, piles, and so on, or in the case of fitting clamp metal for joining the intersecting parts of the abovementioned scaffolding pillars on each of them, or in the case of binding together a plurality of lengthy material such as lumbers, or in many other uses.

A more specific use is in clamping a circular rubber sealing boot to a cylindrical rim structure in an automatic washing machine.

Prior band clamping devices of the present type usually include the securement of the free end of the band on a rotatable shaft on the device after which the shaft is rotated to lock the band on the device. Typical structures of this type are found in U.S. Pat. Nos. 2,383,199; 2,641,817; and 3,962,759. However such prior structures are deficient in providing a simple and efficient means for unlocking the band should it become necessary to release the band from the object being clamped.

Therefore, it is an object of the invention to provide a band clamping device that may be quickly and simply secured in locked position, and which may be just as quickly and simply unlocked from the object being clamped.

A further object of the invention is to provide a band clamping device of the above type that is simple in construction, inexpensive to manufacture, and highly effective in operation.

BRIEF DESCRIPTION OF THE INVENTION

Briefly, the foregoing objects are accomplished by the provision of a band clamping device including a frame having an elongated planar base and a pair of spaced parallel side walls extending upwardly from the sides of the base. A rotary winding shaft extends transversely across the frame and is rotatably mounted in the side walls. The shaft has ratchet teeth disposed circumferentially around its circumference adjacent one end of the shaft interiorly of the spaced walls to form a ratchet wheel on the shaft. The elongated base has an extension at one end bent over upwardly partially upon itself with the free end of the bent over portion forming a resilient pawl operatively and resiliently engaging the teeth of the ratchet wheel for releasably holding the shaft from rotating. A flexible clamping band is provided for encircling an associated object to be clamped and is secured at one end to the other end of the base. The shaft has a band insertion slot formed longitudinally in the shaft between the side walls for receiving the free end portion of the band therein, whereby a preselected length of the free end portion of the band may be inserted in the slot after which the shaft may be rotated to bend and lock the free end portion of the band in the device. The shaft is rotatable clockwise or counterclockwise to lock or unlock the free end portion of the band. The base has a transverse slot formed therein with the one end of the band extending through such transverse slot and thence bent 180° around the other end of the base to secure such one end of the band to the base. The base has a pair of spaced upstanding flanges flanking the band at said other end of the base to retain the band longitudinally on the base. In the preferred form, the pawl is formed of only a portion of the free end of the bent over portion of the extension of the base to provide a resilient pawl enabling the shaft to be releasably held in selected positions of rotation in either direction. The shaft has at its one end a non-circular head (preferably a hex head) disposed exteriorly of the frame which may be grasped by pliers or a wrench to turn the shaft. Also, the shaft has its other end extending outwardly of the frame, and the band insertion slot is an open-ended slot also extending outwardly of the frame whereby a screwdriver may be operatively inserted in the open end portion of the band insertion slot to turn the shaft.

Other objects and advantages of the invention will be apparent from the following description taken in conjunction with the drawings wherein:

BRIEF DESCRIPTION OF THE DRAWINGS

FIG. 1 is a front elevational view of a band clamping device of the invention;

FIG. 2 is an enlarged top plan view of the band clamping device shown in FIG. 1;

FIG. 3 is a portional front elevational sectional view showing the band clamping device of FIG. 1 clamping a rubber sealing boot to a cylindrical rim structure used in an automatic washing machine;

FIG. 4 is an enlarged top plan view of the frame of the band clamping device shown in FIG. 1;

FIG. 5 is a front elevational view of the frame shown in FIG. 4;

FIG. 6 is an enlarged sectional view taken along the line 6—6 of FIG. 5;

FIG. 7 is an enlarged side elevational view of the rotary winding shaft of the device shown in FIG. 1;

FIG. 8 is a left end elevational view of the rotary winding shaft in FIG. 7;

FIG. 9 is a portional view taken along the line 9—9 of FIG. 2, and showing in full lines the position of the parts after the band is inserted in the shaft slot prior to locking the band in the device, and also showing in dot-dash lines the position of the pawl on release of the band;

FIG. 10 is a view similar to FIG. 9, but showing the position of the parts when the device is in fully locked or clamped position; and FIG. 11 is a view similar to FIG. 10, but showing the position of the parts permitting the unlocking of the band from the device.

In the drawings, like numbers and letters are used to identify like and similar parts throughout the several views.

DESCRIPTION OF THE PREFERRED EMBODIMENTS

Referring to the drawings, there is shown a band clamping device D, constructed in accordance with the invention, and having a frame F including an elongated planar base 10 and a pair of spaced parallel side walls 12 and 14 extending upwardly from the sides of the base. A rotary winding shaft 16 extends transversely across the frame and is rotatably mounted in the side walls 12 and 14. The shaft 16 has radially straight ratchet teeth disposed circumferentially around its circumference adjacent one end 16a of the shaft interiorly of the spaced side walls 12 and 14 to form a ratchet wheel 18 on the shaft. The elongated base 10 has an extension 20 at one end 10a bent over upwardly partially upon itself with a part of the free end of the bent over portion 20 forming a resilient pawl 22 operatively and resiliently engaging the teeth of the ratchet wheel 18 for releasably holding the shaft 16 from rotating in either direction. A flexible clamping band 24 for encircling an associated object 26 (for example) to be clamped is secured at one end 24a to the other end 10b of the base.

The shaft 16 has a band insertion slot 28 formed longitudinally in the shaft at the other end 16b of the shaft and a portion of which is disposed between the side walls 12 and 14 for receiving the free end portion of the band 24 therein, whereby a preselected length of the free end portion 24b of the band 24 may be inserted in the slot 28 as shown in FIG. 9, after which the shaft 16 may be rotated (clockwise in FIG. 9) to bend and lock the free end portion 24b of the band in the device D as shown in FIG. 10. The shaft 16 is rotatable clockwise or counterclockwise to lock or unlock the free end portion of the band. For example, after the free end portion 24b of the band is locked in the device D as shown in FIG. 10, it may be unlocked by turning the shaft 16 counter-clockwise 180° to the position shown in FIG. 11 so that the band 24 may be easily removed from the slot 28.

The base 10 has a transverse slot 32 formed therein, and the one end 24a of the band 24 extends through such transverse slot 32 and thence is bent 180° around the other end 10b of the base to secure such one end 24a of the band to the base.

The base 10 has a pair of spaced upstanding flanges 34, 36 flanking the band 24 at the other end 10b of the base to retain the band in proper transverse position on the base.

It is to be noted that the pawl 22 is formed of only a portion of the free end of the bent over portion of the extension 20 of the base 10 (as best shown in FIG. 4), to provide a resilient pawl 22 enabling the shaft 16 to be releasably held in selected positions of rotation in either direction.

The rotary winding shaft 16 has tool applying means thereon enabling manual tool rotation of the shaft. More specifically, the shaft 16 has at its one end 16a (FIG. 7) a noncircular (hexagon) head 38 thereon disposed exteriorly of the frame F (FIG. 2) which may be grasped by pliers or a wrench to turn the shaft 16. Also, the shaft 16 has its other end 16b (FIG. 7) extending outwardly of the frame F (FIG. 2) and the slot 28 is an open-ended slot also extending outwardly of the frame whereby a screwdriver may be operatively inserted in the open end portion of the slot 28 to turn the shaft 16.

Thus, the invention provides a band clamping device D comprising a frame F, a rotary winding shaft 16 rotatably mounted on the frame F, means (pawl 22) on the frame F engaging the shaft 16 for releasably holding the shaft from rotating, such shaft 16 having band insertion slot means 28, and a flexible clamping band 24 secured at one end 24a to the frame, whereby the free end portion 24b of the band 24 may be inserted in the slot means 28 after which the shaft 16 may be rotated to bend and lock the free end portion 24b of the band in the device D, the shaft 16 being rotatable in either direction to lock or unlock the free end portion 24b of the band from the device.

In FIG. 3, the band 24 is shown clamping a rubber sealing boot 26 to a cylindrical rim structure 29 in an automatic washing machine.

The terms and expressions which have been employed are used as terms of description, and not of limitation, and there is no intention, in the use of such terms and expressions, of excluding any equivalents of the features shown and described or portions thereof, but it is recognized that various modifications are possible within the scope of the invention claimed.

A particular inventive concept of the invention is that by rotating the shaft 16 in a counterclockwise direction the resilient pawl 22 will move from the full line position illustrated in FIG. 9 wherein the finger engages the ratchet wheel 18 above a horizontal plane X passing through its axis of rotation, to the dotted-like position shown, wherein the resilient finger engages the ratchet wheel below the horizontal plane X. This counterclockwise rotation of the ratchet will, of course, release the clamping action of the flexible band 24, and thus permit withdrawal movement of the flexible band from slot 28 in the shaft 16 and thus permit loosening of the band with respect to the article it is encircling.

What is claimed is:

1. A band clamping device comprising; a frame including an elongated planar base and a pair of spaced parallel side walls extending upwardly from the sides of the base, a rotary winding shaft extending transversely across the frame and rotatably mounted in said side walls, said shaft having radially straight ratchet teeth disposed circumferentially around its circumference adjacent one end of the shaft interiorly of the spaced walls to form a ratchet wheel on said shaft, said elongated base having an extension at one end bent over upwardly partially upon itself with the free end of the bent over portion forming a resilient pawl operatively and resiliently engaging the teeth of said ratchet wheel for releasably holding the shaft from rotating, and a flexible clamping band for encircling an associated object to be clamped and secured at one end to the other end of the base, said shaft having a band insertion slot formed longitudinally in the shaft at the other end of the shaft and between said side walls for receiving the free end portion of the band therein, whereby a preselected length of the free end portion of the band may be inserted in said slot after which the shaft may be rotated to bend and lock the free end portion of the band in the device, said shaft being rotatable clockwise or counterclockwise to lock or unlock said free end portion of the band, the pawl being formed of only a portion of the free end of the bent over portion of the extension of the base to provide a resilient pawl enabling the shaft to be releasably held in selected positions of rotation in either direction.

2. A band clamping device comprising; a frame including an elongated planar base and a pair of spaced parallel side walls extending upwardly from the sides of the base, a rotary winding shaft extending transversely across the frame and rotatably mounted in said side walls, said shaft having ratchet teeth disposed circumferentially around its circumference adjacent one end of the shaft interiorly of the spaced walls to form a ratchet wheel on said shaft, said elongated base having an extension at one end bent over upwardly partially upon itself with the free end of the bent over portion forming a resilient pawl operatively and resiliently engaging the teeth of said ratchet wheel for releasably holding the shaft from rotating, and a flexible clamping band for encircling an associated object to be clamped and secured at one end to the other end of the base, said shaft having a band insertion slot formed longitudinally in the shaft at the other end of the shaft and between said side walls for receiving the free end portion of the band therein, whereby a preselected length of the free end portion of the band may be inserted in said slot after which the shaft may be rotated to bend and lock the free end portion of the band in the device, said shaft being rotatable clockwise or counterclockwise to lock or unlock said free end portion of the band, said base having a transverse slot formed therein with the one end of the band extending through said transverse slot and thence bent 180° around the other end of the base to secure such one end of the band to the base, said base having a pair of spaced upstanding flanges flanking the band at said other end of the base to retain the band longitudinally on the base, said pawl being formed of only a portion of the free end of the bent over portion of the extension of the base to provide a resilient pawl enabling the shaft to be releasably held in selected positions of rotation in either direction, said shaft having at its one end a noncircular head disposed exteriorly of the frame which may be grasped by pliers or a wrench to turn the shaft, said shaft having its other end extending outwardly of the frame and said band insertion slot is an open-ended slot also extending outwardly of the frame whereby a screwdriver may be operatively inserted in the open end portion of the slot to turn the shaft.

* * * * *